Aug. 21, 1962    R. E. DOMGARD    3,050,607
INSTALLATION SYSTEM FOR ELECTRIC HEATING CABLE
Filed July 14, 1959
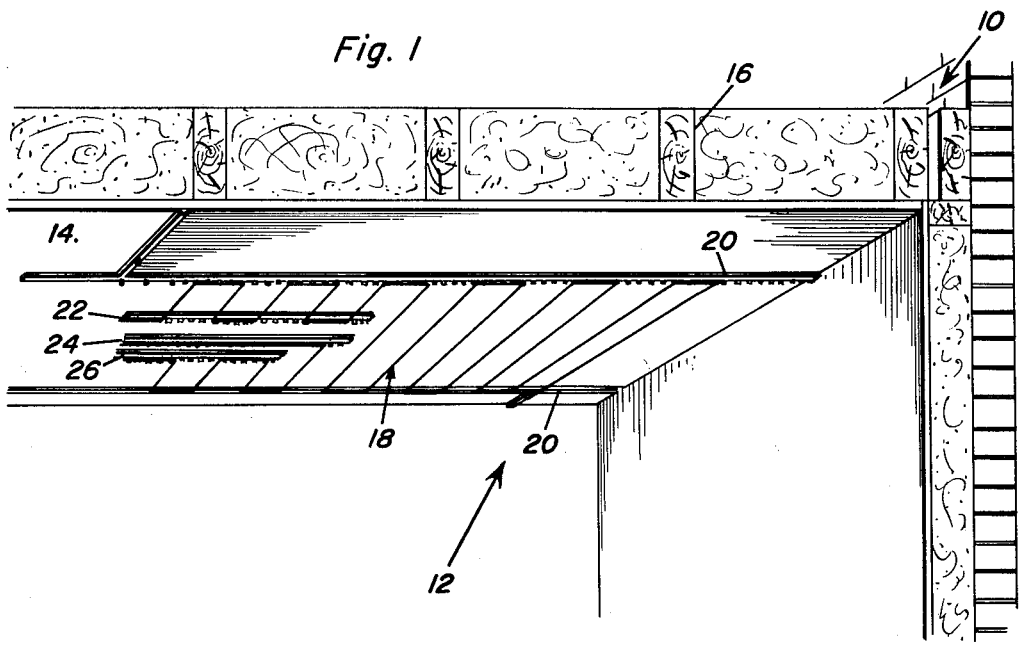
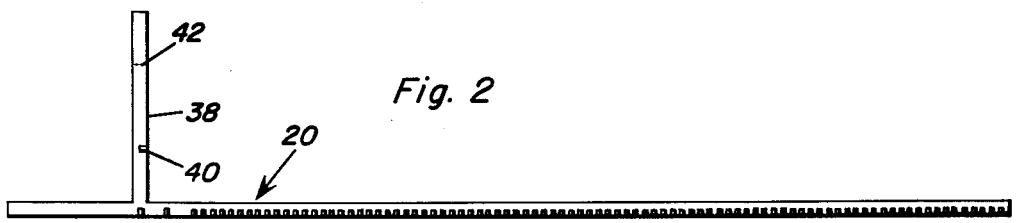
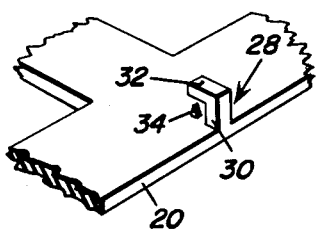
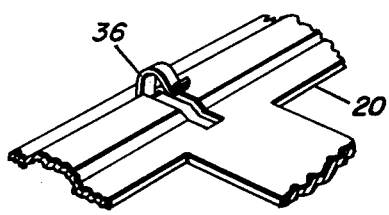
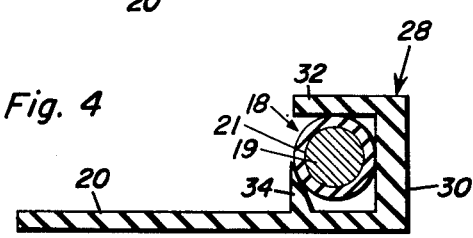
Robert E. Domgard
INVENTOR.

United States Patent Office 3,050,607
Patented Aug. 21, 1962

3,050,607
INSTALLATION SYSTEM FOR ELECTRIC
HEATING CABLE
Robert E. Domgard, 1229 Philip Ave., Norfolk, Nebr.
Filed July 14, 1959, Ser. No. 826,977
4 Claims. (Cl. 219—19)

This invention relates generally to heating equipment and more particularly to ceiling heating systems utilizing electric heating cable.

This invention relates generally to a device or system for providing an easier and more accurate method of installing electric heating cable on the ceiling of a room prior to plastering. By utilizing the device and system disclosed, the heating cable can be strung and supported along the ceiling without utilizing any fasteners, as staples or such, until all of the cable has been strung and the rows have been completely laid out with the correct spacing between them. The invention will permit an installer of electric ceiling heating cable to initially install strips comprising a portion of the invention on the ceiling at opposite ends thereof. The heating cable can then be extended around a first hook and strung back and forth across the ceiling, between the strips, allowing the installer to select the hooks, closely spaced along the strips, which are desired for correct spacings for the rows of cable so as to allow even distribution. This system will permit the installer to completely install all of the cable on the ceiling and make length adjustments as he installs the cable. Heating cable is commercially sold in fixed lengths with cold leads fused to each end of the cable. It is known that a particular room requires a specific length of cable, which should not be cut, for proper heating. Since the cable should not be cut, it is important that the cable be properly hung before it is stapled, the conventional method of installation, so that there will not be an excess of cable and so that there will be no shortage of cable. It is also important that the correct amount of cold leads on the ends of the heating cable be properly positioned so that they may be led back to the source of power. Subsequent to correctly installing the cable on the strips, the cable may then be permanently stapled every few inches along the ceiling as directed by the installation instructions of the manufacturer. The hooks, supported by the strips, are designed to secure the cable at the turns in a manner which will not cause damage to the cable.

Accordingly, it is the principal object of this invention to provide a system for facilitating the installation of heating cable on a room ceiling.

It is more particularly an object of this invention to provide a system for facilitating the installation of heating cable on a room ceiling or such which allows for the proper utilization of the heating cable to extract the optimum heat therefrom. By utilizing the teaching suggested by the invention, the heating cable is most efficiently utilized and the minimum amount of time and effort is expended by an installer in the installation thereof.

It is a more particular object of this invention to provide installing strips which enables electric heating cable to be detachably supported from hooks secured to the strips so that the cable may be properly strung along the ceiling with a minimum of effort.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a portion of a room illustrating a ceiling portion having electric heating cable strung thereon in accordance with the teachings of the invention;

FIGURE 2 is a plan view of a strip adapted to be secured to a ceiling and having electric heating cable supported thereon on the hooks secured thereto;

FIGURE 3 is a fragmentary perspective view of one type of hook utilized in conjunction with the installing strips;

FIGURE 4 is an enlarged sectional view illustrating in detail the cooperation between the heating cable and hooks illustrated in FIGURE 3; and FIGURE 5 is a fragmentary perspective view illustrating a second form of hook which may be secured to or which may form a portion of an installing strip.

With continuing reference to the drawings and initial reference to FIGURE 1, numeral 10 generally indicates the outside bricks of a building or such enclosing a room generally designated as 12 having a ceiling 14 suspended from rafters or joists 16.

It is desired to install electric heating cable 18 on the ceiling 14. Cable 18 is conventional and includes a conductive core 19 covered by an electrical insulator 21. In order to determine the amount of heating cable to be utilized, certain factors must be considered, such as room size, insulation, etc. Upon determining the length of heating cable to be utilized, it is necessary to decide on the manner in which it will be strung on the ceiling 14. Conventionally, installers would merely proceed to staple the heating cable along a ceiling by placing individual staples or fasteners at various points along the ceiling. However, it is found that this is disadvantageous inasmuch as the installer often finds that he has spaced the adjacent rows too closely or too remotely and, accordingly, does not uniformly cover the ceiling to properly and efficiently distribute the heat offered by the heating cable. Accordingly, prior to stapling the heating cable 18 to the ceiling 14, installing strips as 20, 22, 24 and 26 are utilized. The strips are secured to the ceiling 14 by any desired means. Each of the strips 20, 22, 24 and 26 includes hook portions thereon. The particular hooks utilized may be either of those illustrated particularly in FIGURES 3 and 5.

Referring initially to FIGURE 3, it will be noted that extending upwardly from the strip 20 is an inverted, L-shaped member 28 having a vertical leg 30 and a horizontal leg 32 projecting therefrom. Fixed to the strip 20, beneath the end of the horizontal leg 32, is a pointed projection 34.

Referring to FIGURE 5, an alternative form of hook is illustrated wherein a curved projection 36 is struck from the strip 20 and shaped as indicated. It is contemplated that the projection 36 be slightly resilient for detachably retaining the heating cable. The particular material utilized in the formation of the strips is not of prime importance, and it is contemplated that the strips be either molded of a plastic or such or be formed of metal which may be punched and stamped as indicated in FIGURE 5. If the strips are composed of plastic material and the ceiling material covering the wire 18 has a sufficiently low electrical resistance, then the insulation 21 may be omitted.

With the strips supported on the ceiling 14 as indicated in FIGURE 1, the heating cable 18 may be strung between opposed hooks on the various strips as indicated. Inasmuch as it is preferable to assure that the heating cable 18 is properly spaced from any electrical elements, as light fixtures or such, the smaller strips 22, 24, and 26 are provided for allowing the heating cable 18 to be turned intermediate the two terminal installing strips 20. In this manner open areas may be provided for installing lighting fixtures. When the heating cable 18 is properly strung between the various strips so that the adjacent rows of the cable are properly spaced to provide optimum heating, the cable may then be stapled to the ceiling 14. By providing the open hooks for initially supporting the cable, the installer is at liberty to vary the spacings between the adjacent cable rows until the cable is properly oriented.

The strips 20 include a perpendicular extension 38 which is formed therewith and includes one hook 40 thereon and a scribed breakoff point 42. For example only, it is contemplated that the strips be formed of approximately three-quarter inch width and in length of about four feet. The strips 20 will preferably have a six inch margin from the left end to the first hook, then a one and a half inch space between the first and second and second and third hooks, with a one-half inch spacing between each successive hook thereafter. The hook 40 is formed on the perpendicular extension 38 so that the installer, if desired, will have a hook available for his last turn of the cable for returning the cable to the starting point. Or, in lieu thereof, he may break this strip off at the scribed breakoff point 42 and use the extension to measure the margin from wall for properly placing the strip 20. When the strips and cable are properly secured on the ceiling, with the cable being spaced for optimum heat transfer, plaster may be applied for finishing the installation. It will therefore be seen that considerable time and effort has been saved inasmuch as the cable has been properly installed on the ceiling for maximum efficiency, and in the process thereof no staples required removal after they had been improperly placed in the ceiling to support improperly spaced cable rows.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a ceiling heating system including electrical heating cable, means for accurately installing said cable on a ceiling comprising a plurality of insulative mounting strips secured to said ceiling, each of said strips including a plurality of open aligned hooks, said heating cable engaged with and extended around said hooks between said strips for support thereby, at least one of said strips having a perpendicular extension formed therewith and extending away from said strips, said extension supporting a cable hook and having a breakoff line scribed thereon spaced from said one strip.

2. In a ceiling heating system including electric heating cable, means for detachably supporting said cable for facilitating the accurate installation of said cable on a ceiling comprising a plurality of insulative mounting strips secured to said ceiling, each of said strips including a plurality of open aligned hooks, said heating cable extending around said hooks and between said strips at least one of said strips having a perpendicular extension formed therewith and extending away from said strips, said extension supporting a hook and having a breakoff line scribed thereon.

3. The combination of claim 2 wherein each of said hooks comprises two arms joined to form an L-shaped member, one arm joined at one end to one of said strips and extending normal thereto, the other arm extending parallel to said one strip, a projection on said one strip directly below a free end of said other arm, a cam surface on said projection within said hook and sloping toward the juncture of the L-shaped member and one strip.

4. The combination of claim 2 wherein said hooks are punched from a central portion of said strips, said hooks extending over said strips and forming wire receiving chambers therewith.

References Cited in the file of this patent

UNITED STATES PATENTS

| | | |
|---|---|---|
| 1,662,652 | Zimmer | Mar. 13, 1928 |
| 1,697,024 | Rubin | Jan. 1, 1929 |
| 1,753,013 | Lindmark | Apr. 1, 1930 |
| 2,082,099 | Cruser | June 1, 1937 |
| 2,154,184 | Roberts | Apr. 11, 1939 |
| 2,406,884 | Mann et al. | Sept. 3, 1946 |
| 2,478,808 | Deal | Aug. 9, 1949 |
| 2,543,970 | Horsfall et al. | Mar. 6, 1951 |
| 2,613,900 | Byrnie | Oct. 14, 1952 |
| 2,779,849 | Gomersall | Jan. 29, 1957 |
| 2,885,460 | Borresen et al. | May 5, 1959 |
| 2,940,481 | Hunter | June 14, 1960 |
| 2,986,805 | Jonke | June 6, 1961 |
| 2,997,568 | Leopold et al. | Aug. 22, 1961 |

FOREIGN PATENTS

| | | |
|---|---|---|
| 485,842 | Canada | June 13, 1950 |